Aug. 22, 1939.       J. G. W. MULDER       2,170,482
MERCURY-VAPOR RECTIFIER
Filed March 4, 1936        3 Sheets-Sheet 1

INVENTOR
J. G. W. MULDER
By E. H. Olmsroth
ATTORNEY

Aug. 22, 1939.  J. G. W. MULDER  2,170,482
MERCURY-VAPOR RECTIFIER
Filed March 4, 1936    3 Sheets-Sheet 2
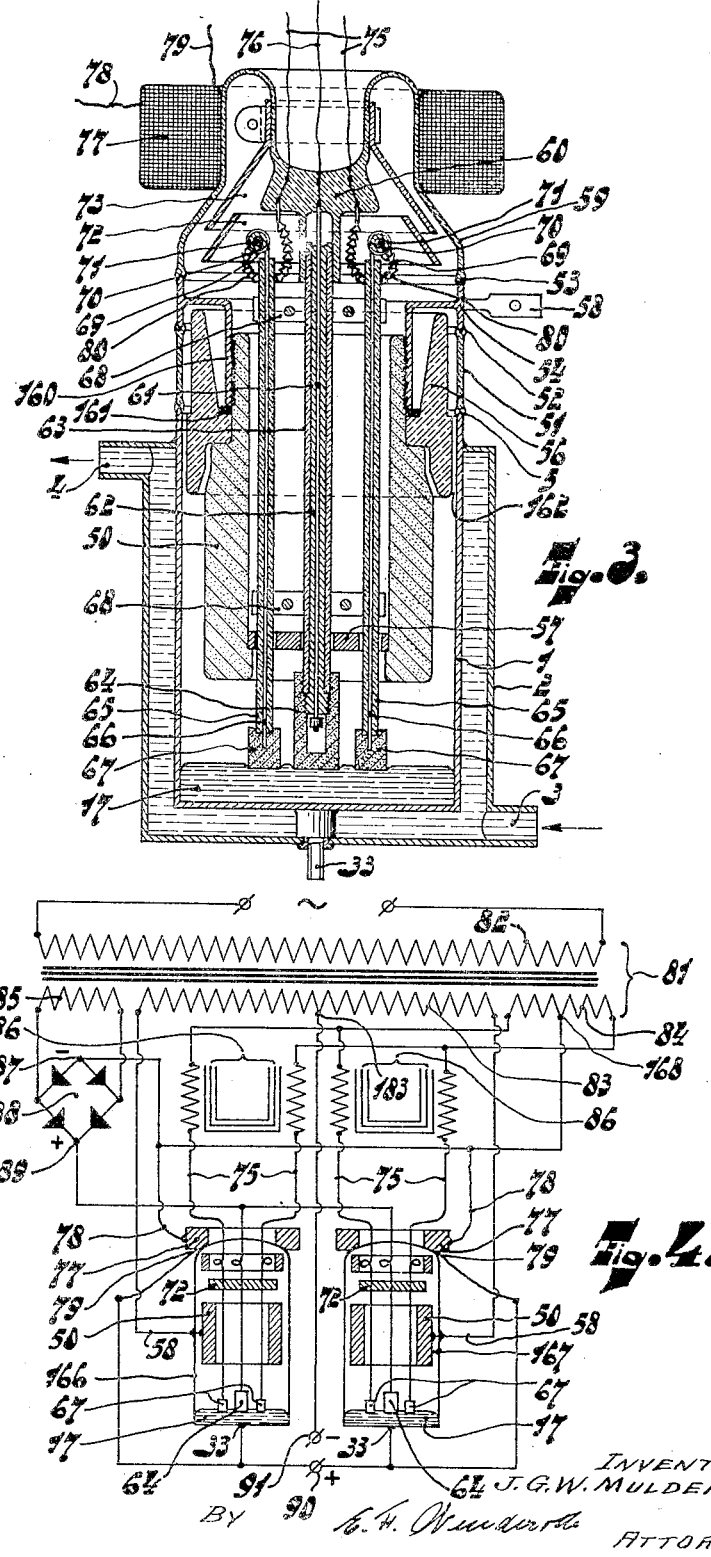

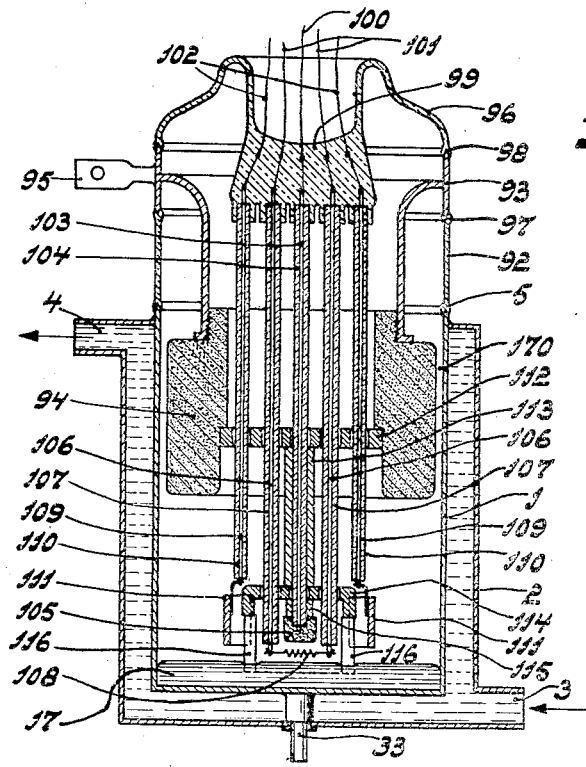
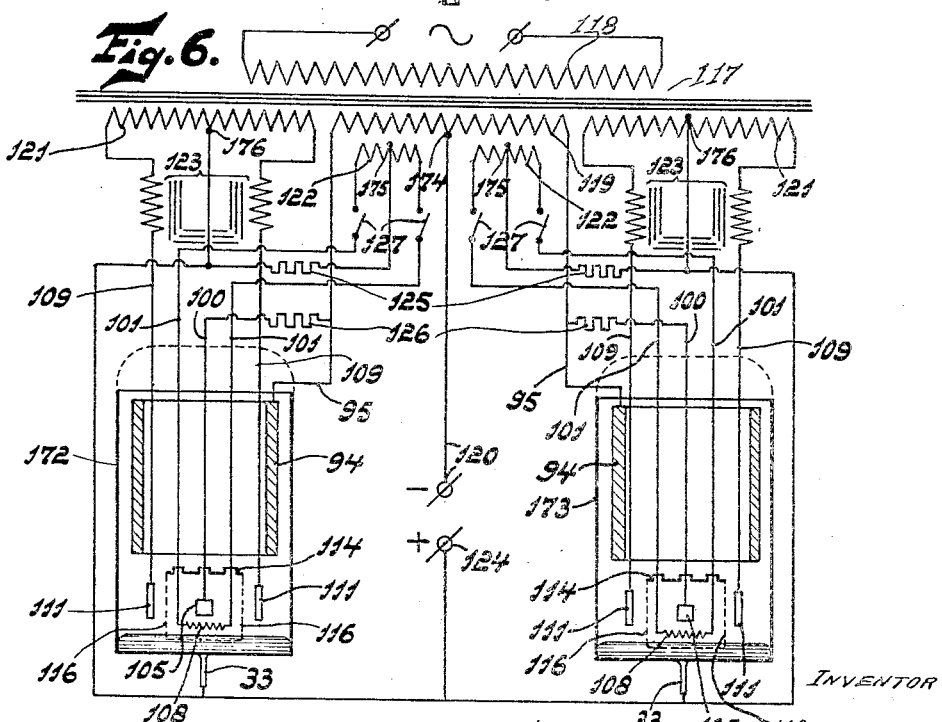

Patented Aug. 22, 1939

2,170,482

UNITED STATES PATENT OFFICE 2,170,482

MERCURY-VAPOR RECTIFIER

Johannes Gijsbertus Wilhelm Mulder, Eindhoven, Netherlands, assignor to N. V. Philips' Gloeilampenfabrieken, Eindhoven, Netherlands Application March 4, 1936, Serial No. 67,155
In Germany March 30, 1935

10 Claims. (Cl. 250—27.5)

My invention relates to single-phase mercury-vapor rectifiers having a liquid mercury cathode and an envelope comprising metal portions and glass portions hermetically sealed together and which may be artificially cooled.

Present day rectifiers using either a liquid mercury or incandescible cathode are generally constructed along two different lines, i. e., with an envelope or discharge vessel which consists primarily of glass, or which consists of metal.

Rectifiers having metal envelopes are usually constructed from several metal portions secured together by means of flanges with the interposition of packing or gaskets. In such cases the joints are not perfectly air-tight and a vacuum pump must be permanently attached to the rectifier to maintain the vacuum of the rectifier during its operation. Such pumps, with their accessories such as measuring instruments, are relatively expensive which increases the cost of such rectifiers and furthermore this increase in cost is practically the same for small capacity rectifiers as for the higher capacity ones.

Rectifiers having glass envelopes have the advantage that they can be made perfectly air-tight and thus no further evacuation is required during their operation. This greatly reduces the cost of such rectifiers as regards metal rectifiers. On the other hand glass rectifiers are limited to comparatively low current capacity due to manufacturing difficulties in making envelopes of the required dimensions and also to the fact that it is difficult to properly cool the rectifier to avoid melting of the glass.

Due to the above difficulties there are serious drawbacks to manufacturing glass rectifiers which have a current capacity above 100 amperes. On the other hand metal rectifiers are not practical for use below about 300 amperes because of their cost and the complicated pumping equipment.

Thus for the rectification of currents lying between about 100 and 300 amperes the present-day rectifiers are unsuitable as regards their cost, size and efficient operation.

The object of my invention is to overcome the above-mentioned difficulties and to provide a rectifier which is compact, relatively inexpensive to manufacture and is particularly adapted for a rectified current output from about 70 to 400 amperes DC at any voltage up to 500 volts DC.

According to my invention, I provide a single-phase rectifier having preferably a liquid mercury cathode with an envelope having metal portions and vitreous portions hermetically sealed together and which may be artificially cooled in a simple and effective manner.

Although attempts have been made to construct such metal-glass rectifiers these attempts have only been successful with incandescible cathodes, and up to the present time rectifiers having a mercury cathode and a metal-glass envelope have been unsuccessful. However, mercury cathodes are vastly superior to the incandescible, e. g. oxide cathodes by reason of their unlimited life and the absence of a special heating supply.

I have found that these attempts have failed due to the fact that the metal to glass seals are destroyed by the heat of the main discharge and also by the splashing of the mercury thereon. Furthermore, these difficulties become more pronounced when such rectifiers are reduced in size in order to make them more compact. In addition when such rectifiers are constructed with a plurality of anodes their construction becomes very complicated and there is great danger of the occurrence of back discharges. I eliminate the latter difficulty by using a single-phase construction which also simplifies the manufacture of the rectifiers.

More particularly, in accordance with the invention, the envelope comprises a lower part formed by a substantially cylindrically-shaped metal vessel or container in the bottom of which is disposed the liquid-mercury cathode, and an upper portion which is sealed to the container and consists at least partly of vitreous material. Above the mercury I arrange means for initiating and in some cases also maintaining an auxiliary discharge, and dispose the main anode axially above the auxiliary-discharge initiating means and support the anode from the upper portion of the envelope.

To protect the metal-glass seals, as well as portions of the glass envelope and various other members of the rectifier, from the deleterious influences of the main discharge and the splashing of the mercury, I provide means including the main anode to substantially separate these parts, i. e. the seals, portions and members just referred to from the main discharge space of the rectifier.

In accordance with the invention, this separation can be effected in several manners. In one embodiment of my invention the main anode is given such a shape and size that these parts are enclosed in a space which communicates with the main discharge space only through a narrow annular passageway formed between the main anode and the wall of the metal container.

In another arrangement to maintain the required insulation capacity between the main anode and the metal container, one or more members of electrical and heat insulating material are provided to separate the seals from the discharge space.

In one embodiment of my invention, which provides a very compact arrangement of the main anode, ignition electrodes, auxiliary electrodes, and the external connections thereto, the main anode is axially supported from the upper part of the envelope, and the auxiliary-electrode supports pass through axially-extending recesses provided in the periphery of the anode; whereas the electrodes are connected to external connections sealed in the vitreous portion of the envelope.

In some cases, particularly for a very high current rectifier, for instance 300 amperes, I support the main anode by means of an annular metal member sealed in the envelope which member also serves to carry the high anode current. By providing the main anode with a central bore and passing the electrode supports therethrough, again a very compact construction is obtained together with a very favorable ratio of weight and surface area of the anode to the current.

As the mercury-vapor rectifiers according to the invention are of the single-phase type, means are provided to form a cathode spot on the surface of the mercury cathode and also to maintain the cathode spot during the single-phase pulsations of the main discharge. For this purpose I either electromagnetically lift an electrode immersed in the mercury or use an auxiliary incandescible cathode.

When using an immersed electrode, its movement can be controlled by alternating-current or direct-current. If direct-current is used—in view of the fact that the rectifier has no rectifying action at the time the ignition is effected—an auxiliary rectifier may be provided to supply the actuating direct-current with the connections so arranged that the auxiliary rectifier is in operation only while the ignition takes place.

When an auxiliary incandescible cathode is used I also provide suitable means for protecting the same from the main discharge.

The single-phase rectifier tube according to the invention is particularly advantageous for use in full-wave and poly-phase rectifying installation, as will be set forth in detail as the description progresses.

In order that my invention may be clearly understood and readily carried into effect, I will describe same more fully with reference to the several specific embodiments as illustrated in the accompanying drawings in which:

Figure 3 is a sectionized side-view of a single-phase mercury-vapor rectifier according to another embodiment of my invention;

Fig. 4 is a schematic diagram of a full-wave rectifying installation using rectifiers of the type shown in Fig. 3;

Fig. 5 is a sectionized side-view of a single-phase mercury vapor rectifier according to my invention, and in which an auxiliary incandescible cathode is used for ignition;

Fig. 6 is a schematic diagram of a device for the full-wave rectification of single-phase current by means of rectifiers as shown in Fig. 5.

Figure 1:
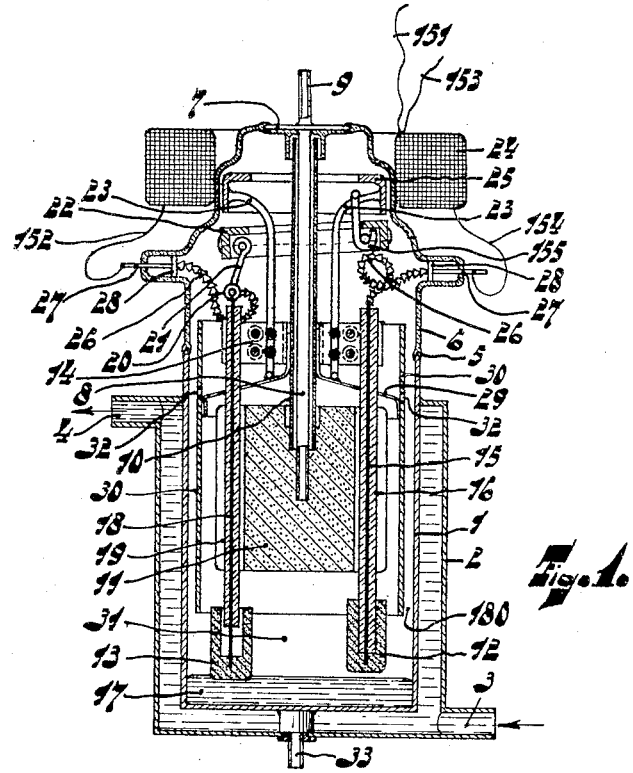
Figure 1 is a sectionized side-view of a single-phase mercury-vapor rectifier according to the invention.

The envelope of the single-phase, mercury-vapor rectifier shown in Fig. 1 comprises a cup-shaped cathode vessel or container 1 of metal, for instance chrome iron, hermetically sealed at 5 to a top portion 6 of vitreous material. Such metal-to-glass seals and the method of making same have been described in the U. S. Patent #1,947,417 to G. Holst.

Surrounding the greater portion of container 1 is a cooling jacket 2 having an inlet port 3 and an outlet port 4, through which a suitable cooling fluid, such as water, is circulated during the operation of the rectifier. Disposed within the container 1 is a mercury cathode 17 having an external connection 33 passing through the wall of the jacket 2 in a liquid-tight manner.

Supported by means of a conductive rod 8 from a metal disc 7 hermetically sealed in the vitreous portion 6 and provided with a terminal 9, is a main anode 11 having a cylindrical shape. The rod 8 is surrounded by a tube 10 of insulating material such as steatite extending into a counterbore in the top of anode 11.

Fixedly secured to the tube 10 is a metal supporting bracket or clamp 14 carrying on one end a tube 16 and on its other end a tube 19; the tubes 16 and 19 being of insulating material such as steatite passing through recesses in peripheral surface of the anode 11.

Disposed slightly above the level of the mercury 17 and secured to the lower end of tube 16, is an auxiliary stationary anode 12 provided with conductive rod 15 passing through the bore of the tube 16.

Slidably mounted within the bore of the tube 19 is a conductive rod 18 carrying on its lower end an auxiliary movable anode 13 which, in the position shown, is slightly immersed in the mercury 17. It should be noted that the rod 19, even in the lower position of the anode 13, extends into a cavity in the anode 13.

To move the auxiliary anode 13 into and out of contact with the mercury cathode 17, suitable electromagnetic actuating means are provided. As shown in Fig. 1, these means comprise a coil 24 arranged around the vitreous portion 6, a stationary ring 25 of ferromagnetic material, and a movable ring-shaped armature 22 of ferromagnetic material.

The coil 24 comprises two windings simultaneously wound in a bifilar manner and having leads 153—154 and 151—152 respectively. The lead 154 is connected to a pin 27 hermetically sealed in the vitreous portion 6 and connected through a flexible conductor 26 and conductive rod 15 to the anode 12. In a similar manner, lead 152 is connected to anode 13. The portion of the pin 27 falling within the envelope is protected from the discharge space of the rectifier by means of an insulating disc 28, e. g. of mica.

The ring 25 is supported by means of two arms 23 secured to the bracket 14, for instance by welding. Secured to the right-hand arm 23 is a hook-shaped arm 155 hingedly supporting at one end the armature 22 whereas the movable end of the armature 22 is connected by means of a link 21 to the looped end 20 of the rod 18. Thus upon the proper energization of the windings 151—152 and 153—154 armature 22 is attracted by the stationary ring 25 thereby raising the anode 13 from the mercury 17.

To protect the seal 5, as well as the glass portion 6, from the heat of the main discharge and from the splashing of mercury thereon, means are provided to separate these portions from the main discharge space of the rectifier. For this purpose a frusto-conical shaped screen 29 is provided above the anode 11 and supported from the lower ends of rods 23. The screen 29 has a cylindrical portion extending along the tube 10 and has secured to its periphery a cylindrical screen 30 provided with apertures 32 and extending below the lower surface of the anode 11. The screen 30, which is of a refractory metal such as molybdenum, is arranged close to the walls of the container 1 to form a long and narrow passageway 180.

To prevent the condensed mercury forming in the upper part of the envelope from falling upon anode 1, the rods 16 and 19 pass through the screen 29 with a tight fit whereby the condensed mercury falls upon the upper surface of screen 29, passes through the apertures 32, and drops to the mercury 17.

From the above it appears that the rectifier has a very small size due to the compact arrangement of the main anode and the auxiliary anodes. Tubes constructed in this manner and having a normal DC output of 70 amperes have the following dimensions.

Anode diameter 1⅜", length 2⅝", internal diameter of the cathode vessel 2½", distance between the cathode surface and the bottom of the anode 2½", overall dimensions of the discharge vessel 10" high, 2¾" diameter not including the cooling jacket around the cathode vessel. Furthermore, due to the use of the screens 29 and 30, the space surrounding the seal 5 communicates with the main discharge space 31 only through the long and narrow passageway 180. Thereby the glass portion 6 and the seal 5 is completely protected against injury by the splashing of mercury and by the heat of the main discharge.

Figure 2:
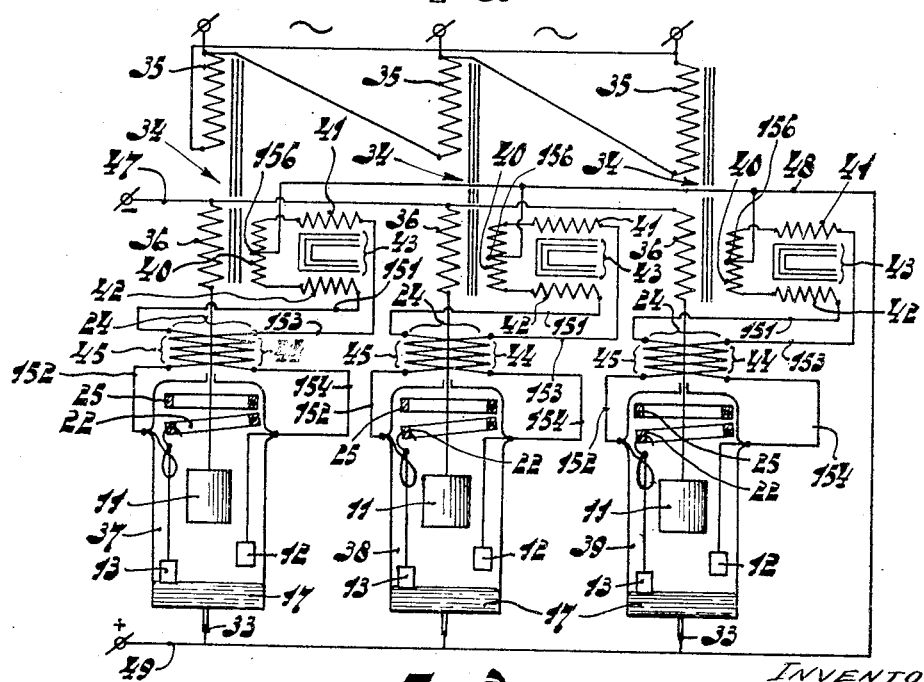
Figure 2 is a schematic diagram of a three-phase rectifying installation using three rectifiers of the type shown in Figure 1.

The use of the single-phase rectifiers of the type shown in Fig. 1, in a three-phase rectifying device is illustrated in Fig. 2 in which reference numeral 34 denotes a three-phase transformer having three primary windings 35 delta-connected across a three-phase supply, (not shown), three main secondary windings 36, and three auxiliary secondary windings 40 having central taps 156. The single-phase rectifiers 37, 38 and 39, which are similar to the rectifier shown in Fig. 1 and have similar parts denoted by same reference numerals, have their cathode terminals 33 connected through a conductor 49 to the positive terminal of a direct current load (not shown).

The main secondary windings 36 are star-connected with their star point connected through a conductor 47 to the negative terminal of the direct current load, whereas their free ends are connected to the main anodes 11.

The auxiliary windings 40, which serve for supplying the auxiliary discharge current, have their center taps 156 connected to conductor 48 and through conductor 49 to the cathode connections 33 and to the positive terminal of the direct current load. One end of each winding 40 is connected through a choke coil 41 and winding 44 to the stationary anode 12, whereas their other ends are connected through choke coils 42 and windings 45 to the movable anode 13.

For clarity the bifilar coil 24 has been shown as a coil having two separate windings 44 and 45.

The device shown in Fig. 2 operates in the following manner: In the position shown, the transformer 34 is deenergized and the movable auxiliary anodes 13 are immersed in the mercury 17. With the apparatus in this position each of the anodes 13 completes a circuit starting from the mid tap 156 of an auxiliary winding 40, through conductor 48, cathode connections 33, mercury 17, anode 13, lead 152, winding 45, lead 151 and a choke coil 42 back to one end of the winding 40. Upon energization of the transformer 34, this circuit is energized by a current of such value that the movable iron rings 22 are raised and lift the anodes 13 from the mercury 17, whereby an auxiliary discharge is struck between the anodes 12 and 13 and the mercury cathode 17. This auxiliary discharge maintains in known manner the cathode spot necessary for the main discharge.

The auxiliary discharge current of anode 12 passes through winding 44 and the auxiliary discharge current of anode 13 passes through winding 45 and these windings are so arranged that the magnetic fields produced thereby have the same direction. Thus the auxiliary anodes 13 are retained with certainty in their raised position by means of the pulsating direct current in windings 44 and 45.

If the ignition of the auxiliary discharges of one of the rectifiers does not immediately take place in the above manner, or if the device should be temporarily cut out of circuit, the ignition will be automatically repeated until the auxiliary discharges of all the rectifiers are initiated.

Upon connecting a direct current load across the conductors 47 and 48, the main discharge of each rectifier will be immediately formed upon the cathode spot already present on the surface of the mercury and the device will function in the usual manner.

Similar to the rectifier of Fig. 1, the single-phase mercury-vapor rectifier shown in Fig. 3 has a cup-shaped metal cathode container 1 surrounded by a cooling jacket 2. The remaining portion of the envelope, however, differs from that of Fig. 1 and comprises a ring shaped vitreous portion 51 sealed at 5 to the container 1, a metal member 54 sealed at 52 to the portion 51, and a top vitreous portion 59 sealed at 53 to the metal member 54 and having a reentrant portion forming a pinch 60.

The member 54 extends inwardly and downwardly into a threaded cylinder 160 to which is screwed a main anode 50 provided with a central bore.

Clamped between the anode 50 and the cylinder 160 with the interposition of a metal gasket 161 is a ring-shaped member 56 of refractory, electric and heat insulating material, for instance porcelain or steatite. The member 56 substantially fills the space between the anode 50 and the walls of the container 1 with exception of a long and narrow passageway 162, whereby the seals 5 and 52 are disposed in a space which communicates with the main discharge space only through the passageway 162.

In addition to supporting the anode 50, the member 54 also serves as the electrical connection thereto and for this purpose is provided with an external terminal 58. It should be noted that in this construction the outer surface of the anode 50 is sufficiently spaced from the container 1 to insure the proper insulation.

Secured in the pinch 60 and conected to a lead 76 is a conductive rod 61. Slidable along the rod 61 and surrounded by an insulating tube 63 is a metal tube 62, to whose lower end is screwed an auxiliary electrode 64. Supported from tube 63 by means of two brackets or clamps 68 are two insulating tubes 65 carrying at their lower ends auxiliary anodes 67. The anodes 67 are connected to conductive rods 66 passing through tubes 65, and are insulatingly secured by means of pins 71 and insulating bushings 70 to a frustoconical ring 72 of ferro-magnetic material. The rods 66 are electrically connected through suitable flexible leads 80 to external leads 75 sealed in the pinch 60. Thus auxiliary anodes 67 and electrode 64 are secured together and can be moved as a unit in a vertical direction upon movement of the ring 72.

The vertical movement of the anodes 64 and 67 is effected by means of an actuating coil 77, and a frusto-conically shaped metal member 73 clamped to the reentrant part of the vitreous portion 59. The coil 77 is provided with two leads 78 and 79 and upon energization thereof, the member 72 is magnetized to thereby lift the anodes 64 and 67 out of contact with the mercury 17.

It should be noted that the rod 61 is stationary and the metal tube 62 slides along same whereby the connection between the anode 64 and the lead 76 is made through these sliding surfaces.

To separate the upper portion of the rectifier from the main discharge space and thus to protect the seal 53 and the glass portion 59, a disc 57 of heat insulating material, for instance steatite closes the central bore of anode 50. The disc 57 is provided with apertures for the rods 62 and 65; these apertures being of such size as to guide the rods without interfering too much with their vertical movement.

The full-wave rectifying device shown in Fig. 4 comprises two single-phase rectifiers 166 and 167, a supply transformer 81, two choke coils 86, and an auxiliary rectifier 88. The rectifiers 166 and 167 are of the construction shown in Fig. 3 and have similar parts denoted by the same reference numerals.

The supply transformer 81 has a primary winding 82 connected to a suitable source of single-phase alternating current, a main secondary winding 83 having a mid tap 183, and two auxiliary secondary windings 85 and 84; the winding 84 being provided with a mid tap 168.

The secondary winding 83 serves to supply the current for the main discharge and for this purpose has one end connected to the anode 50 of rectifier 166 and its other end connected to the anode 50 of rectifier 167, whereas its mid tap 183 is connected to the negative terminal 91 of a direct-current load (not shown) whose positive terminal 90 is connected to the cathode terminals 33 and to the leads 79 of coils 77.

The secondary winding 84 has its ends connected through choke coils 86 and leads 75 to the auxiliary anodes 67, whereas its mid-tap 168 is connected to leads 78 of coils 77, and also to the negative terminal 87 of the auxiliary rectifier 88, which rectifier is connected across the winding 85 in a Graetz circuit with its positive terminal 89 connected to the anodes 64. The auxiliary rectifier 88 is of low capacity and may be of the dry type.

The operation of the device takes place in the following manner: With the device in its inoperative position as shown, energization of transformer 81 causes the direct-current produced by rectifier 88 to pass through a circuit including positive terminal 89, electrode 64, mercury 17, lead 79, coil 77, lead 78 and back to the negative terminal 87. The pulsating direct-current passing through coil 77 energizes same whereby the auxiliary electrodes 64 and 67 are raised out of contact with the mercury. By making the voltage of this circuit less than the arc voltage of the main discharge or of the auxiliary discharges the flow of the direct current from auxiliary rectifier 88 ceases when the electrode 64 is in its upper position.

However, the auxiliary electrodes are held in their upper position by passing through the coil 77 the rectified current pulsations of the auxiliary discharge. Voltage for this discharge is supplied from winding 84 and the discharge current passes from the ends of winding 84 through choke coils 86, anodes 67, cathode 17, leads 79, coils 77 and leads 78 to the central tap 168 of the winding 84. The passage of this pulsating direct current through the coils 77, maintains with certainty the electrodes 67 and 64 in their raised position above the level of the mercury 17. Should the ignition fail to take place for some reason the operation will be automatically repeated.

By properly selecting for the circuit of the auxiliary rectifier 88, a direct-current voltage value which does not exceed the arc voltage of the main and auxiliary discharges of the rectifiers 166 and 167, there will be no current flow between electrode 64 and mercury 17 when the electrode 64 is in its raised position. As the load on the rectifier 88 ceases immediately upon ignition of the auxiliary discharge, the rectifier 88 may be given very small dimensions which also reduces its cost.

The auxiliary discharge between the anodes 67 and mercury 17 maintains a cathode spot upon the surface of the mercury 17 whereby the device may be placed into operation by connecting a direct-current load to the terminals 90 and 91.

The single-phase mercury-vapor rectifier shown in Fig. 5 is similar in many respects to the rectifier of Fig. 2 and has similar parts denoted by the same reference numerals. However, in the rectifier of Fig. 5 the ignition is effected by a static device comprising an incandescible cathode 108.

Similarly to the rectifiers of Figs 1 and 3, the rectifier of Fig. 5 comprises a cup-shaped cathode container 1 surrounded by a cooling jacket 2 having an inlet port 3 and an outlet port 4. Sealed at 5 to the edge of the container 1 is a vitreous ring 92 having sealed to its other end a metal member 93. The member 93 is similar in construction and function to the member 59 of Fig. 3 and is provided with an inwardly and downwardly-extending flange to which is screwed a main anode 94 having a central bore. Thus the member 93 supports the anode 94 and also serves as an electrical connection thereto for which purpose it is provided with an external terminal 95.

Sealed at 98 to the upper edge of member 93 is a vitreous portion 96 having a pinch 99 into which are hermetically sealed supply leads 100, 101 and 102. Sealed at one end in the pinch 99 and carrying on its other end an auxiliary anode 105 is a conductive rod 103 surrounded by an insulating tube 104.

Disposed slightly above the surface of the mercury cathode 17 and supported from the pinch 99 by conductive supports 106 is an auxiliary incandescible cathode 108 whose ends are connected through the supports 106 to the leads 101. The supports 106 are surrounded by insulating tubes 107.

Supported from the anode 105 and insulated therefrom by an insulating bushing 115, is a cup-shaped screen 114 partly emerging into the mercury 17 and provided with two slots 116. The screen 114, which is made of iron but may consist as well of a heat-proof insulating material or carbon surrounds the auxiliary anode 105 and the cathode 108.

Supported from the pinch 99 and connected to the leads 102 are conductive supports 109 surrounded by insulating tubes 110 and carrying on their lower ends two auxiliary anodes 111 disposed above the surface of the mercury 17 and outside the screen 114.

The peripheral surface of the main anode 94 is arranged close to the walls of the container 1, whereby the space in the vicinity of seals 5 and 97 communicates with the main discharge space of the rectifier only through a long narrow annular passageway 170.

Closing the central bore of anode 94 and supported from the top of the screen 114 by an insulating bushing 113 is an apertured disc 112 of heat insulating material, for instance. The tubes 104, 107 and 110 pass through the disc 112 with a close fit whereby the disc 112 separates the upper portion of the rectifier and seal 98 from the main discharge space of the tube.

Thus it is seen that, due to the small spacing between the peripheral surface of the anode 94 and the wall of container 1, and to the use of the disc 112, the seals 5, 97, and 98 are protected from the main discharge and also from the splashing of mercury. Furthermore, by providing the main anode with a central bore the rectifier is made compact and the anode is given a large surface area in proportion to its weight.

The full-wave rectifying device illustrated in Fig. 6 comprises two single-phase rectifiers 172 and 173 similar to the rectifier of Fig. 5, a supply transformer 117, and two choke coils 123.

The transformer 117 has a primary winding 118 connected to a suitable source of single-phase direct-current (not shown), a main secondary winding 119 having a mid tap 174, two auxiliary secondary windings 122 having mid taps 175, and two auxiliary secondary windings 121 having mid taps 176.

The main secondary winding 119 has its ends connected through leads 95 to the main anodes 94, and its central tap 174 connected to the negative terminal 120 of a direct current load (not shown) whose positive terminal 124 is connected to the cathode terminals 33 of the rectifiers 172 and 173.

The auxiliary secondary windings 121 serve to supply the auxiliary discharge current and have their ends connected through the choke coils 123 and leads 109 to the corresponding auxiliary anodes 111, whereas their mid-taps 176 are connected to the cathode terminals 33 and positive terminal 124, and also through a resistance 125 to the mid-tap 175 of the incandescible cathode winding 122 whose ends are connected through leads 101 to the ends of incandescible cathodes 108, a switch 127 being incorporated in each of the incandescible cathode circuits.

Each of the auxiliary anodes 105 is connected through lead 100, a fixed resistance 126, and lead 95 to the main anode 94 of the corresponding rectifier.

The rectifying device of Fig. 6 operates in the following manner: Upon connecting the primary winding 118 to the alternating-current supply, the windings 122 supply heating current to the incandescible cathodes 108, whereby these cathodes attain their emission temperature. Thereupon auxiliary discharges are struck between the cathodes 108 and the anodes 105; the current value of these discharges being limited by the resistances 126. These auxiliary discharges greatly aid in initiating the auxiliary discharges proper of the rectifiers through the slots 116.

The auxiliary discharges proper first develop between the cathode 108 and the auxiliary anodes 111, however, due to the voltage drop set-up by the passage of this discharge current through the resistances 125, which are included in the conductors connecting the central tap 175 to the central tap 176 the cathodes 108 are given a positive potential relative to the cathode mercury 17. Thus the screens 114, being immersed in the mercury 17, are made negative relative to the cathodes 108. Due to this negative potential of the screens 114, the foot point of the auxiliary discharge is urged out of the interior of screen 114 from the cathode 108, along the surface of the mercury 17 through the slots 116, and forms a cathode spot on the surface of the mercury outside the screen. This permits the rectifying device to be placed into normal operation via the main anodes 94 as soon as a load is connected to the terminals 120 and 124. Finally to conserve current and also to increase the life of the cathode the heating current of the auxiliary cathode 108 may be cut off by means of the switches 127.

While I have described my invention in connection with specific examples and applications, I do not wish to be limited thereto but desire the appended claims to be construed as broadly as permissible in view of the prior art.

What I claim is:

1. A single-phase mercury-vapor rectifier comprising an envelope having a metal portion and a glass portion hermetically-sealed thereto, a mercury cathode disposed in said metal portion, a substantially cylindrical shaped main anode disposed above the surface of the mercury, an auxiliary incandescible cathode and an auxiliary electrode disposed near the surface of the mercury, a cup-shaped screen disposed above the surface of the mercury and substantially surrounding said auxiliary cathode, and means including said anode for substantially separating the metal-glass seal and the glass portion from the main discharge space of the rectifier.

2. A single-phase mercury-vapor rectifier comprising an envelope having a metal portion and a glass portion hermetically-sealed thereto, a mercury cathode disposed in said metal portion, a main anode disposed above the surface of the mercury, an auxiliary incandescible cathode and an auxiliary electrode disposed near the surface of the mercury, a cup-shaped screen provided with an aperture, said screen surrounding said incandescible cathode and being partly submerged in the mercury with a portion of the aperture extending therefrom, and means substantially separating the space in the vicinity of the metal-glass seal and the glass portion from the main discharge space of the rectifier.

3. A single-phase mercury-vapor rectifier comprising an envelope having a metal portion and a glass portion hermetically sealed thereto, a mercury cathode disposed in said metal portion, a substantially cylindrical-shaped main anode disposed above the surface of the mercury, an auxiliary incandescible cathode disposed above the surface of the mercury, an auxiliary anode disposed near said incandescible cathode, a cup-shaped screen substantially surrounding said incandescible cathode and said auxiliary anode, an auxiliary electrode disposed outside said screen and near the surface of the mercury, and means substantially separating the space in the vicinity of the metal-glass seal and glass portion from the main discharge space of the rectifier.

4. A compact single-phase mercury-vapor rectifier comprising a discharge vessel having a lower cup-shaped metal portion and an upper glass portion hermetically fused to said metal portion, a mercury cathode in said metal portion, a main anode, means including said anode separating the space within said vessel into an upper chamber bounded mainly by said glass portion and a lower chamber in restricted communication with the upper chamber and bounded mainly by said metal portion and the active surface area of the anode, and means to artificially cool said metal portion and to cause substantially all the mercury vapor to condense on the surface thereof.

5. A compact single-phase mercury-vapor rectifier comprising a discharge vessel having a lower cup-shaped metal portion and an upper glass portion hermetically fused to said metal portion to form a metal-to-glass seal, a mercury cathode in said metal portion, a main anode within said vessel and having a diameter slightly less than that of the metal portion, means including said anode separating the space within said vessel into an upper chamber bounded mainly by said glass portion and a lower chamber in restricted communication with the upper chamber and bounded mainly by said metal portion and the active surface area of the anode, said metal-to-glass seal forming part of the wall of said first chamber, and means to artificially cool said metal portion and to cause substantially all the mercury vapor to condense on the surface thereof.

6. A compact single-phase mercury-vapor rectifier comprising a discharge vessel having a lower cup-shaped metal portion and an upper glass portion hermetically fused to said metal to form a metal-to-glass seal, a mercury cathode in the bottom of said metal portion, electrodes within said vessel including a main anode having a diameter slightly less than that of the metal portion, means including said anode separating the space within said vessel into an upper chamber bounded mainly by said glass portion and a lower chamber in restricted communication with the upper chamber and bounded mainly by said metal portion and the active surface area of the anode, current supply conductors for said electrodes, said conductors passing through said glass portion, and means to artificially cool said metal portion and to cause substantially all the mercury vapor to condense on the surface thereof.

7. A compact single-phase mercury-vapor rectifier comprising a discharge vessel having a lower cup-shaped metal portion and an upper glass portion hermetically fused to said metal portion, a mercury cathode in said metal portion, a main anode provided with a peripheral groove, means including said anode separating the space within said vessel into an upper chamber bounded mainly by said glass portion and a lower chamber in restricted communication with the upper chamber and bounded mainly by said metal portion and the active surface area of the anode, an electrode within said metal portion, a support for said electrode, said support passing through said groove, a lead for said electrode hermetically-sealed in said glass portion, and means to artificially cool said metal portion and to cause substantially all the mercury vapor to condense on the surface thereof.

8. A compact single-phase mercury-vapor rectifier comprising a discharge vessel having a lower cup-shaped metal portion and an upper glass portion hermetically fused to said metal portion, a mercury cathode in said metal portion, a main anode provided with a central bore, an electrode within said cup-shaped portion, a support for said electrode passing through said bore, a lead for said electrode hermetically-sealed in said glass portion, a partitioning member in said bore, means including said anode and said member separating the space within said vessel into an upper chamber bounded mainly by said glass portion and a lower chamber in restricted communication with the upper chamber and bounded mainly by said metal portion and the active surface area of the anode, and means to artificially cool said metal portion and to cause substantially all the mercury vapor to condense on the surface thereof.

9. A compact single-phase mercury-vapor rectifier comprising a discharge vessel having a lower cup-shaped metal portion and an upper glass portion hermetically fused to said metal portion to form a metal-to-glass seal, a mercury cathode in said metal portion, a main anode, a member of heat-insulating material surrounding said anode at a point beneath said seal, means including said anode and said member separating the space within said vessel into an upper chamber bounded mainly by said glass portion and a lower chamber in restricted communication with the upper chamber and bounded mainly by said metal portion and the active surface area of the anode, and means to artificially cool said metal portion and to cause substantially all the mercury vapor to condense on the surface thereof.

10. A compact single-phase mercury-vapor rectifier comprising a discharge vessel having a lower cup-shaped metal portion and an upper glass portion hermetically fused to said metal portion, a mercury cathode in said metal portion, a main anode, means including said anode separating the space within said vessel into an upper chamber bounded mainly by said glass portion and a lower chamber in restricted communication with the upper chamber and bounded mainly by said metal portion and the active surface area of the anode, said anode forming with the inner surface of said metal portion a long passageway of small cross-section interconnecting said two chambers, and means to artificially cool said metal portion and to cause substantially all the mercury vapor to condense on the surface thereof.

JOHANNES GIJSBERTUS
WILHELM MULDER.